(12) United States Patent
Matta et al.

(10) Patent No.: US 8,443,623 B2
(45) Date of Patent: May 21, 2013

(54) THERMALLY-CONTROLLED PACKAGING DEVICE AND METHOD OF MAKING

(75) Inventors: Auston Robert Matta, Chicago, IL (US); Jeremy Vaught, Souderton, PA (US); Kenneth Maltas, Arlington Heights, IL (US)

(73) Assignee: Tegrant Diversified Brands, Arlington Heights, IL (US)

( * ) Notice: Subject to any disclaimer, the term of this patent is extended or adjusted under 35 U.S.C. 154(b) by 399 days.

(21) Appl. No.: 12/902,863

(22) Filed: Oct. 12, 2010

(65) Prior Publication Data

US 2011/0083826 A1 Apr. 14, 2011

Related U.S. Application Data

(60) Provisional application No. 61/251,131, filed on Oct. 13, 2009.

(51) Int. Cl.
*F25D 3/08* (2006.01)
(52) U.S. Cl.
USPC .................................. 62/457.2; 62/530
(58) Field of Classification Search
USPC ............. 62/530, 457.2, 259.1, 517, 516, 371; 165/104.13, 104.21
See application file for complete search history.

(56) References Cited

U.S. PATENT DOCUMENTS

| | | | |
|---|---|---|---|
| 3,826,625 A * | 7/1974 | Bailey | 117/23 |
| 5,532,039 A * | 7/1996 | Payne et al. | 428/116 |
| 5,626,936 A | 5/1997 | Alderman | |
| 5,669,233 A | 9/1997 | Cook et al. | |
| 5,770,295 A | 6/1998 | Alderman | |
| 5,899,088 A | 5/1999 | Purdum | |
| 5,943,876 A | 8/1999 | Meyer et al. | |
| 5,950,450 A | 9/1999 | Meyer et al. | |
| 5,976,400 A | 11/1999 | Muffett et al. | |
| 6,104,611 A * | 8/2000 | Glover et al. | 361/700 |
| 6,116,042 A | 9/2000 | Purdum | |
| 6,119,573 A * | 9/2000 | Berens et al. | 89/1.816 |
| 6,192,703 B1 | 2/2001 | Salyer et al. | |
| 6,463,212 B1 * | 10/2002 | Salyer | 392/341 |
| 6,574,971 B2 | 6/2003 | Suppes | |
| 6,609,392 B1 | 8/2003 | Brown | |
| 6,635,174 B1 | 10/2003 | Berg et al. | |
| 6,765,031 B2 | 7/2004 | Salyer et al. | |
| 6,778,908 B2 * | 8/2004 | Martorana et al. | 702/9 |

(Continued)

FOREIGN PATENT DOCUMENTS

WO WO 97/47918 12/1997

OTHER PUBLICATIONS

US Salt. Superior General Purpose Salt. Product Data Sheet. 1 page. Undated.

(Continued)

*Primary Examiner* — Mohammad Ali
(74) *Attorney, Agent, or Firm* — Dorsey & Whitney LLP (57) ABSTRACT

A phase change device for controlling temperature within a confined environment, comprising a foam material, a phase change material, the phase change material being absorbed into the foam, and a protective covering encasing the foam material/phase change material. A method for making a phase change device for controlling temperature within a confined environment, comprising providing a phase change material, providing a foam material, absorbing the phase change material into the foam material, and sealing the foam material/phase change material within a protective covering.

11 Claims, 11 Drawing Sheets

U.S. PATENT DOCUMENTS

| | | | |
|---|---|---|---|
| 6,855,410 B2* | 2/2005 | Buckley | 428/311.11 |
| 7,005,181 B2* | 2/2006 | Albert et al. | 428/315.7 |
| 7,257,963 B2 | 8/2007 | Mayer | |
| 7,294,374 B2 | 11/2007 | Romero | |
| 7,324,340 B2* | 1/2008 | Xiong | 361/700 |
| 7,328,583 B2 | 2/2008 | Hillman et al. | |
| 7,422,143 B2 | 9/2008 | Mayer | |
| 7,500,593 B2 | 3/2009 | Mayer | |
| 7,516,600 B1 | 4/2009 | Flora | |
| 2002/0147242 A1* | 10/2002 | Salyer et al. | 521/50 |
| 2002/0164474 A1* | 11/2002 | Buckley | 428/308.4 |
| 2003/0124278 A1* | 7/2003 | Clark et al. | 428/35.7 |
| 2003/0124318 A1* | 7/2003 | Magill et al. | 428/195 |
| 2003/0152764 A1* | 8/2003 | Bunyan et al. | 428/328 |
| 2003/0195448 A1* | 10/2003 | Jensen | 602/41 |
| 2003/0236628 A1* | 12/2003 | Martorana et al. | 702/9 |
| 2004/0161571 A1* | 8/2004 | Duvall et al. | 428/40.5 |
| 2004/0222780 A1* | 11/2004 | Yamada et al. | 324/110 |
| 2005/0012561 A1* | 1/2005 | Young et al. | 331/176 |
| 2005/0188714 A1 | 9/2005 | Wallace | |
| 2005/0244312 A1 | 11/2005 | Suppes et al. | |
| 2006/0088271 A1* | 4/2006 | Ghoshal | 385/147 |
| 2008/0003491 A1* | 1/2008 | Yahnker et al. | 429/62 |
| 2008/0099492 A1 | 5/2008 | Mayer | |
| 2008/0315151 A1 | 12/2008 | Suppes et al. | |
| 2009/0039088 A1 | 2/2009 | Williams et al. | |
| 2009/0078708 A1 | 3/2009 | Williams | |
| 2009/0145092 A1 | 6/2009 | Flora | |
| 2009/0230138 A1 | 9/2009 | Williams et al. | |
| 2011/0199177 A1* | 8/2011 | Lehto et al. | 337/306 |

OTHER PUBLICATIONS

United Foam. Reticulated Foam. Retrieved from http://steplaw.com/reticualtedfoam.html on Oct. 8, 2009. 2 pages.

Kim et al. "Development of microwave foaming method for phenolic insulation foams" Journal of Materials Processing Technology 201 (2008) pp. 716-719.

Dvorchak et al. "Use of Phenolic Foam in Low-Slope Roofing" Koppers Co., Inc. Monroeville, Pa. Symposium on Roofing Technology. NRCA, National Roofing Contractors Association. 1985. Retrieved from http://docserver.nrca.net/technical/328.pdf. pp. 360-367.

Yang et al. "Synthesis of hierarchical porous carbon particles by hollow polymer microsphere template" Colloids and Surfaces A: Physicochem. Eng. Aspects 345 (2009) pp. 121-126.

Ben et al. "Development of Pultrusion Techniques of Phenolic Foam Composites" Report of the Research Institute of Industrial Technology, Nihon University No. 69, 2003 pp. 1-12. ISSN 0386-1678.

* cited by examiner

THERMALLY-CONTROLLED PACKAGING DEVICE AND METHOD OF MAKING

CROSS-REFERENCE TO RELATED APPLICATION

The present application claims the benefit of priority to U.S. Provisional Patent Application Ser. No. 61/251,131, filed Oct. 13, 2009, titled "Thermally-Controlled Packaging Device and Method of Making," the entire contents of which are incorporated herein by reference.

TECHNICAL FIELD

The present disclosure relates to devices and methods for thermally controlling packages for shipment or transport. More specifically, the present disclosure relates to foam-based phase change devices and methods for making the same.

BACKGROUND

In various industrial, agricultural, culinary, and pharmaceutical applications, it may be required to ship or otherwise transport products at temperatures less than or greater than the ambient temperature, in order to avoid spoilage or other degradation. For example, pharmaceutical items such as vaccines and other biological substances are particularly sensitive to thermal variation during shipment, and must be contained in a highly thermally controlled environment. Likewise, fresh food products may require a specified temperature range during transport in order to obtain the maximum shelf-life upon arrival at their point of sale.

Many such products are required by law to be stored and shipped in what is known in the art as a "cold chain." A cold chain is an unbroken, temperature-controlled supply chain of storage and distribution which originates at the point of manufacture and terminates at the end consumer. For example, the Food and Drug Administrative enforces strict cold chain requirements on the storage and distribution of drugs and other biological products in order to ensure their safety, efficacy, and quality.

One approach to a cold chain is to use packaging that is insulated and has thermal control devices that can be cooled and packaged with the contents to hold the package contents at a targeted temperature range. Existing thermal-control devices suffer from a variety of inefficiencies and problems in field use. For example, gel-based devices, e.g., filled plastic bags, are not suitable for some applications, as "slumping" may occur in the shape of these devices during phase change. Dry ice blocks may sublimate during shipping, causing carbon dioxide to accumulate at pressure—many forms of transportation, such as air transportation, require dry ice containers to carry special warning labels. Wet ice is prone to leakage when not handled properly, and it is inefficient at maintaining temperature for more than short periods of time.

Further, existing thermal-control devices may be inappropriate for transportation or shipping that requires a precise thermal range. For example, dry ice sublimates at −78.6 degrees Celsius, and must be kept at a distance from the product within the packaging for typical applications which require the temperature to be maintained between −15 and −5 degrees Celsius in order to avoid damaging the product. This concern is particularly prevalent in the pharmaceutical industry, which often requires shipment of biological products within a temperature range covering just a few degrees Celsius.

Phase change materials are known in the art as materials which use changes in physical phase to absorb or release heat at a relatively constant temperature. Typically, phase change materials undergo the physical transformation known as fusion (freezing/melting), which carries an associated latent heat. Known phase change materials include salts, hydrated salts, fatty acids, and paraffins, among others. Such phase change materials, suitably packaged, may be used as thermal devices.

Unlike dry or wet ice, most phase change materials are not readily adaptable for shipping and transportation applications by themselves. They must be adapted to a substrate or other carrier which contains the phase change material in a defined form and at a defined location within the packaging. This additional requirement has led to inefficiencies in existing phase change devices, such as cooling capacity and weight-to-volume characteristics, which are particularly important concerns for shipping and transportation. For some phase change materials a porous substrate has been used as an absorbing and carrying medium. In U.S. Pat. No. 6,765,031, a micropore open cell foam is used. In some embodiments absorption of the phase change material into the foam is driven by application of vacuum and greater-than-atmospheric pressure.

What is needed in the art is an improved thermal control phase change device, and methods for making the same, suitable for use in packaging for the shipment and transportation of temperature sensitive products.

SUMMARY

Accordingly, an object of the present disclosure is to provide improved phase change devices for applications in transportation and storage, and methods for making the same. In one embodiment described herein, a phase change device for controlling temperature within an environment, comprises a foam material with both macropores and micropores connected to macropores, wherein the foam material is characterized as having macropores of a diameter between about 100 to 400 microns, and micropores of a diameter between about 0.5 to 100 microns; a phase change material, the phase change material being absorbed into the foam material; and a protective covering encasing the foam material and phase change material.

In another embodiment, a method for making a phase change device for controlling temperature within an environment comprises providing a phase change material; providing a foam material having both macropores and micropores connected to macropores, wherein the foam material is characterized as having macropores of a diameter between about 100 to 400 microns, and micropores of a diameter between about 0.5 to 100 microns; absorbing the phase change material into the foam material; and sealing the foam material/phase change material within a protective covering.

While multiple embodiments are disclosed, still other embodiments of the present disclosure will become apparent to those skilled in the art from the following detailed description, which shows and describes illustrative embodiments. As will be realized, the invention is capable of modifications in various aspects, all without departing from the spirit and scope of the present disclosure. Accordingly, the drawings and detailed description are to be regarded as illustrative in nature and not restrictive. Particularly, drawings are provided which depict embodiments of a particular shape. It will be understood that these drawing are meant merely to illustrate example shapes, and many other shapes will be possible, all within the scope of the present disclosure.

BRIEF DESCRIPTION OF THE FIGURES

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIG. 1b is a side view of the phase change device of FIG. 1a.

FIG. 1c is a side view of the phase change device of FIG. 1a.

FIG. 2b is an SEM magnified view at 320× of the physical properties of the foam material of FIG. 2a.

FIG. 5b is a detailed illustration of one procedure in the process of FIG. 5a.

FIG. 5c is a detailed illustration of another procedure in the process of FIG. 5a.

DETAILED DESCRIPTION

The present disclosure relates to devices and methods for thermally controlling packages for shipment or transport. More specifically, the present disclosure relates to foam-based phase change devices and methods for making the same. The disclosed phase change devices exhibit improved weight-to-volume characteristics and improved manufacturing efficiencies, in addition to improved cooling efficiency and longevity.

Phase Change Device

Overview.

A phase change device in accordance with the present disclosure may include a foam material having low weight and high absorbency, a phase change material, and a protective covering. In some embodiments, a predetermined amount of phase change material may be absorbed into the foam material, and the protective covering may surround the foam material and may be vacuum sealed to maintain a predetermined shape of the foam material and to prevent any of the phase change material from leaking out of the foam material. The phase change device may take the form of a three-dimensional rectangular or "brick" shape, although other three-dimensional shapes are possible for special packaging applications which may require other shapes.

Figure 1A:
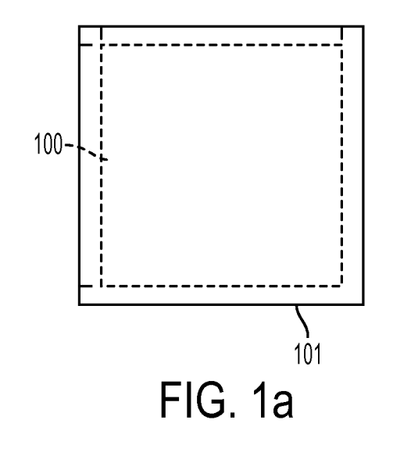
FIG. 1a is a top view of a phase change device in accordance with one embodiment.
Figure 1B:
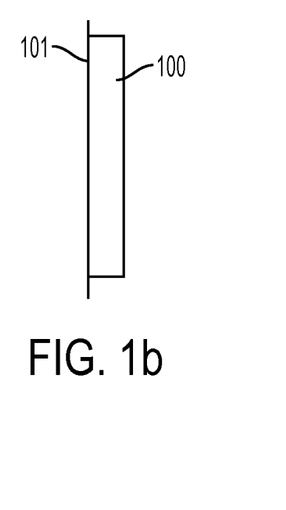
Figure 1C:
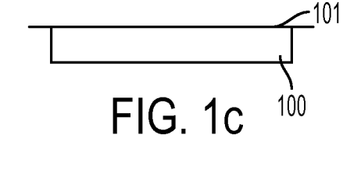

FIGS. 1a-c depict the shape and relative dimensions of a phase change device 100 in a three-dimensional rectangular or brick shape in a top view (FIG. 1a) and two side views (FIGS. 1b-c). As shown, the phase change device 100 has a length and a width of similar dimensions, and a depth which is significantly less than the length or width. A top face of the device 100 may have a cover film 101 which extends laterally beyond the dimensions of the length and width of the rest of the device 100.

Figure 1D:
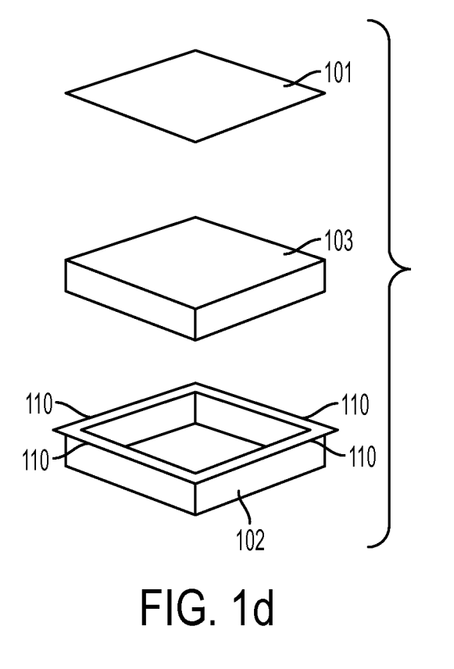
FIG. 1d is a deconstructed view of the phase change device of FIGS. 1a-1c.

FIG. 1d depicts a deconstructed representation of a phase change device in a three-dimensional rectangular shape. A bottom film 102 may be provided, formed to have a base, four sides extending generally perpendicularly from the base, and four sealing edges 110 extending generally perpendicularly from the sides (or in a plane generally parallel to the plane of the base). A block of foam material 103 (with phase change material absorbed therein) may be provided having dimensions such that it fits substantially within the volume defined by the base and sides of the bottom film 102. A cover film 101 may be provided having dimensions such that it covers the foam material 103 and mates with the sealing edges of the bottom film 102.

A fully constructed phase change device may have the foam material (with phase change material absorbed therein) 103 inserted within the volume defined by the bottom film 102, and the top film 101 sealed along the sealing edges 110 of the bottom film 102 to fully cover and enclose the foam material. As previously discussed, the fully constructed phase change device is depicted in FIGS. 1a-1c.

Figure 1E:
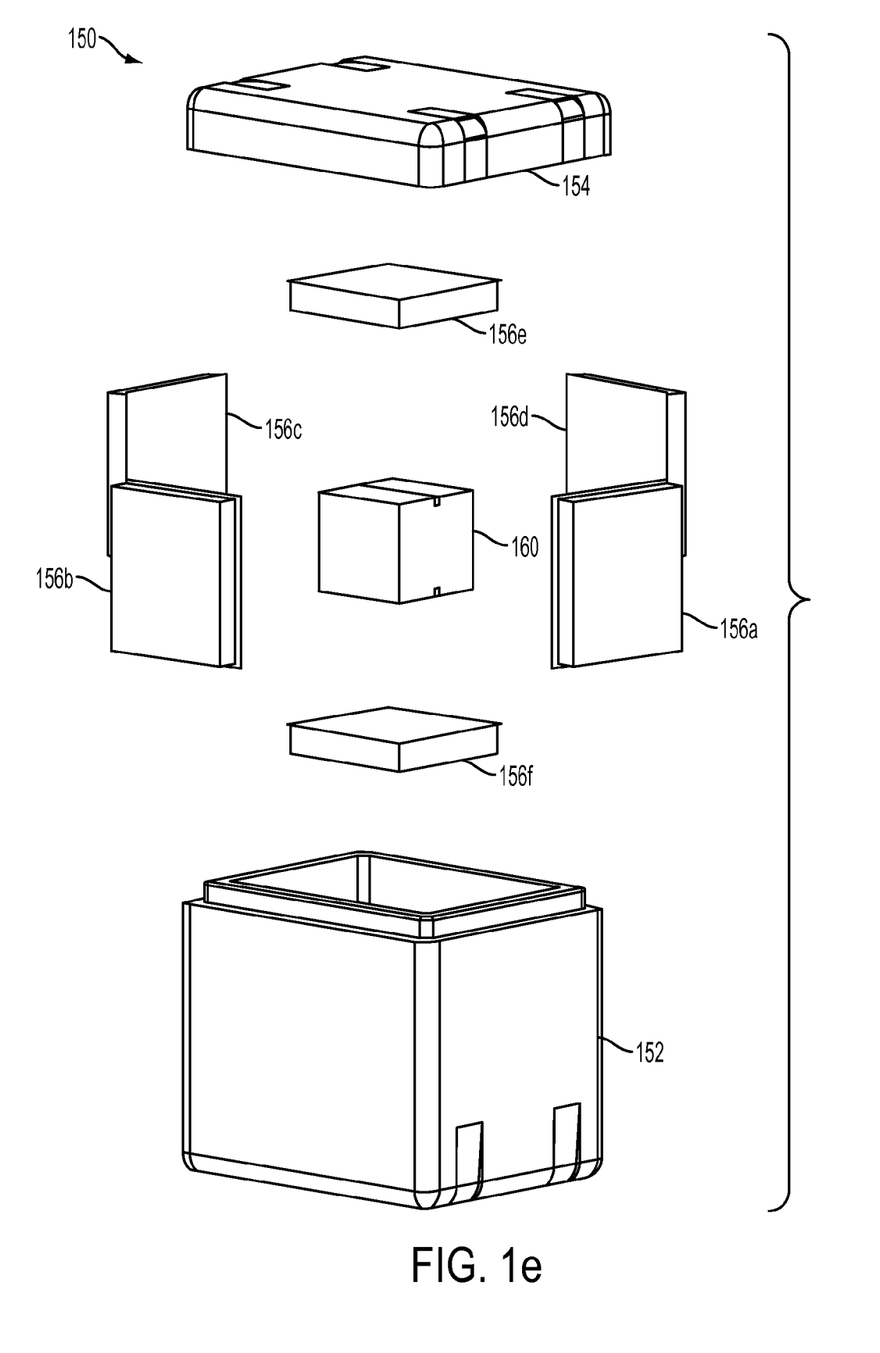
FIG. 1e is a deconstructed view of a container using several of the phase change devices of FIGS. 1a-1c.

FIG. 1d shows a container 150, representing one example of an application in which several phase change devices may be used. Container 150 has a base box 152 with a lid 154, both made of insulated material, such as an insulating foam. To the extent the lid fits relatively tightly and/or may be sealed, the container 150 is a confined environment where temperature may be controlled, based on the anticipated insulating value of the material from which the base 152 and lid 154 are made and the thermal design of the phase change devices. A payload 160, the item to be kept within a desired temperature range, is shown. Surrounding the payload 160 on four sides is a set of four phase change devices 156a-156d. Two further phase change devices 156e-156f form a top and bottom to completely enclose the payload 160. Alternatively, the container may lack a lid 154 or may have significant venting, in which case the environment is not confined but rather will be more subject to ambient conditions, while still providing some thermal protection.

Foam Material.

Figure 2A:
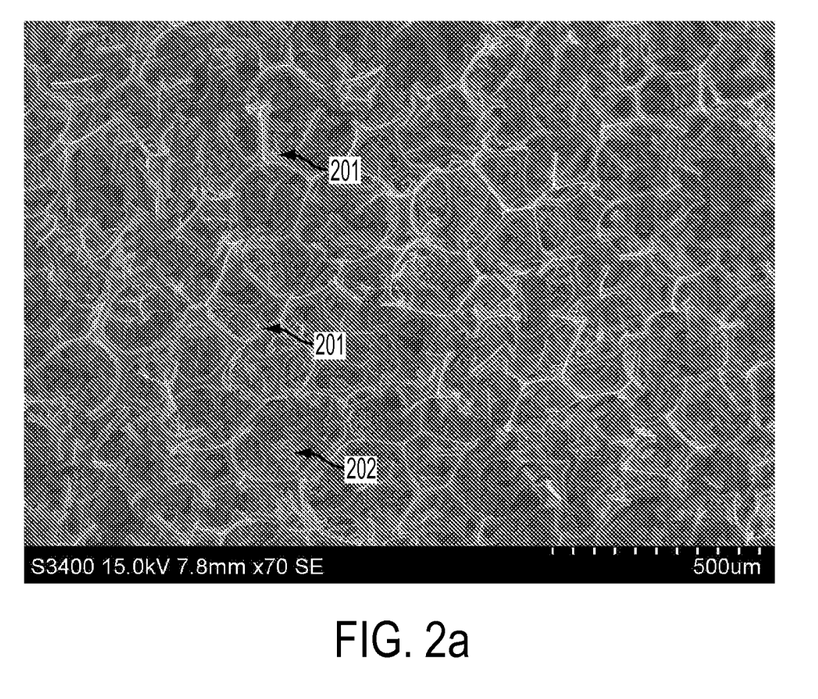
FIG. 2a is an SEM magnified view at 70× of the physical properties of a foam material suitable for use in one phase change device, where water is the phase change material.
Figure 2B:
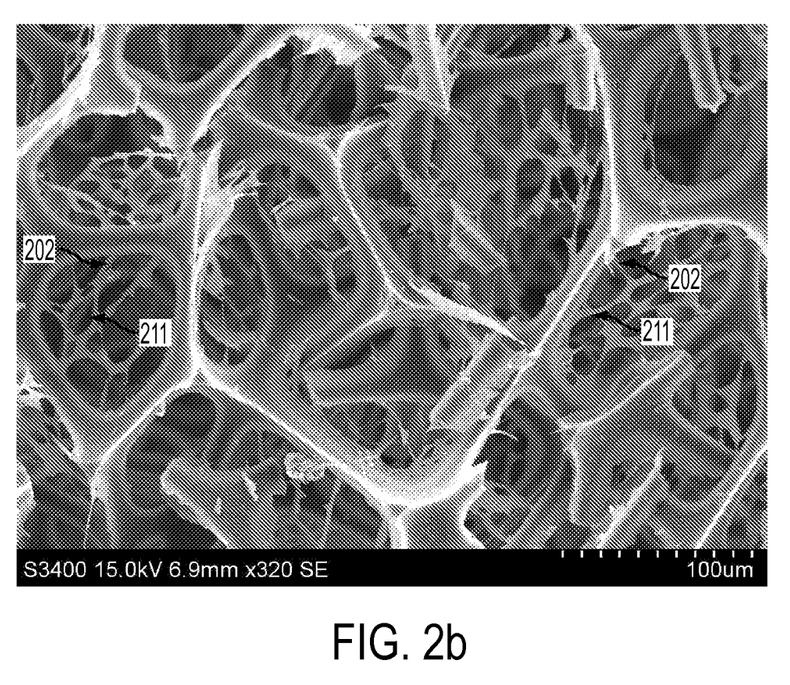

Referring now particularly to the foam material, its primary purpose is as a matrix for giving form to and holding the phase change material in both its solid and fluid phases; that is, the foam is shape-stable. Such a foam is one type of means for absorbing the phase change material in its liquid form. As such, the foam is "open cell" and provides mostly voids within which the phase change material may be held. Because it is desired to fill the volume occupied by the foam with a phase change material, the foam is an open cell foam. FIGS. 2a-2b are magnified (at 70× and 320× times magnification, respectively) scanning electron microscope (SEM) photographs, showing in cross-section the porous structure and composition of one suitable foam material where water is the phase change material. In FIG. 2a, reference numeral 201 depicts a typical macropore cell, while reference numeral 202 indicates a macropore cell wall or lattice containing micropores (not readily visible in this magnification) connected to a macropore 201. As is shown in FIG. 2a, an open cell structure comprises numerous irregularly-shaped open macropores, or "cells," which may be filled by a phase change material. In FIG. 2b, reference numeral 202 shows lattices containing one or more micropores 211 that are within the macropores. Such a lattice within a macropore may form all or part of a cell wall of a macropore or may be positioned such that it is better viewed as an internal structure for a larger cell or macropore. The macropores and micropores of the means for absorbing provide a pathway for a phase change material to progressively fill the macropores at greater and greater depths within the foam. The relative size and ratio of macropores to micropores determines the total absorbency of phase change material in the foam, as well as the speed at which the phase change material absorbs. Without being bound by theory, the micropores provide strong capillary action to lead the phase change material into the foam and hold it, while the macropores provide larger volumes for containing the phase change material but provide less capillary action.

Figure 2C:
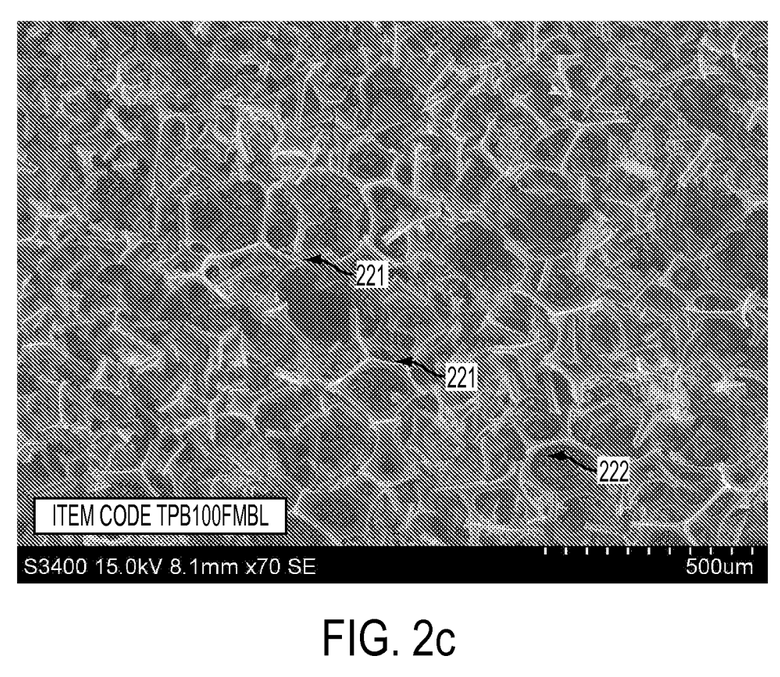
FIG. 2c is an SEM magnified view at 70× of the physical properties of a foam material suitable for use in one phase change device, where a saline solution is the phase change material.
Figure 2D:
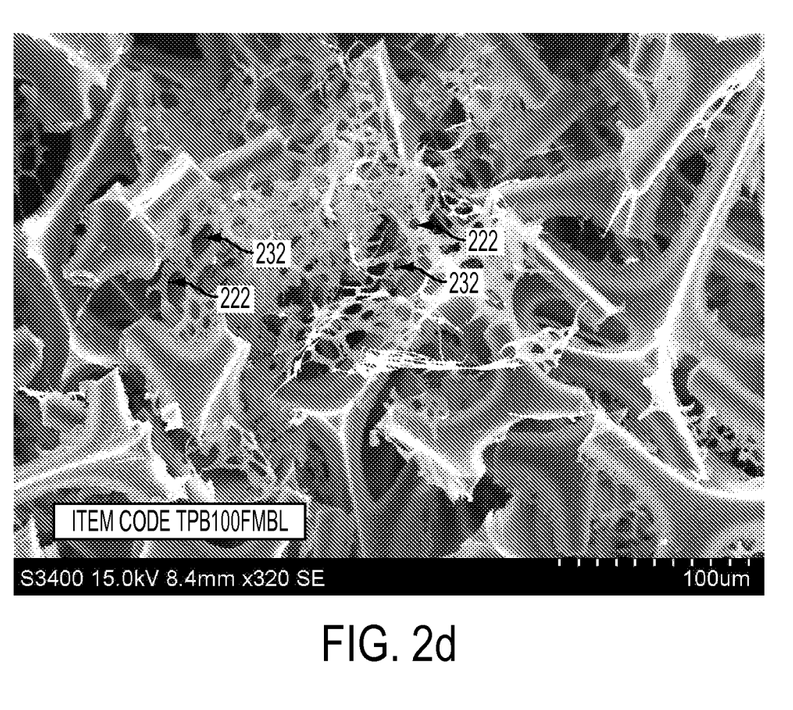
FIG. 2d is an SEM magnified view at 320× of the physical properties of the foam material of FIG. 2c.

FIGS. 2c-2d are magnified (at 70× and 320× times magnification, respectively) scanning electron microscope (SEM) photographs, showing in cross-section the porous structure and composition of one suitable foam material where an aqueous saline solution is the phase change material. In FIG. 2c, reference numeral 221 depicts a typical macropore cell, while reference numeral 222 indicates a macropore cell wall or lattice containing micropores (not readily visible in this magnification) connected to a macropore 221. As is shown in FIG. 2c, as with FIG. 2a, an open cell structure comprises numerous irregularly-shaped open macropores, or "cells," which may be filled by a phase change material. In FIG. 2d, reference numeral 222 shows lattices containing one or more micropores 232. Again, such a lattice may form all or part of a cell wall of a macropore or may be positioned such that it is better viewed as an internal structure for a larger cell or macropore. Relative to FIGS. 2a and 2b, FIGS. 2c and 2d appear to show less lattice structure and thus fewer micropores per unit of volume, and/or less lattice structure in macropore walls.

A foam material or means for absorbing suitable for use with the present disclosure may be made using many suitable polymeric materials that can be formed into a foam, such as polyurethanes, polystyrenes, phenol derivatives, and other materials as will be known to those skilled in the art. Such foam materials or means for absorbing may be similar to those used for water-holding floral foam, including certain phenolic foams. Phenolic foams in accordance with the present disclosure may include phenol-aldehyde resol resins. Such resol resins may be prepared by reacting one or more phenols with an excess of one or more aldehydes in an aqueous phase and in the presence of an alkaline catalyst.

In some embodiments of the present disclosure, an open-cell phenolic foam having both macroporous structures and microporous structures may be used as the means for absorbing. In these foams, the macropore forms the dimensions of the open cell, and the micropores are contained within the walls or internal lattices of the cell membranes and form irregular channels between one or more cells, i.e., the micropores are connected to macropores. Open-cell phenolic foams for use in the phase change device may have macropore sizes in the range of about 100 to 400 microns in diameter, and micropore sizes in the range of about 0.5 to 100 microns in diameter. These foams may further be characterized as having densities of about 0.00069 to 0.00084 pounds/cubic inch. One particular foam type having these aforementioned characteristics that has been found to be suitable for use with the disclosed device is "natural foam" or regular grade foam sold by Smithers-Oasis of Kent, Ohio, with item codes TPB100FMBL (represented in FIGS. 2c-d) and FPP64FOMBL, FPP15FOMBL, and FPP24FOMBL (represented in FIGS. 2a-b).

An open-cell phenolic foam in accordance with the present disclosure may be characterized as having lattice formations as part of the macroporous structure. A lattice may be formed in a "net" or "web-like" configuration, and may comprise one or more micropores. Any macroporous structure within the foam may be defined as having several lattices, one lattice, or no lattices associated therewith. Such lattice structures may define the boundary between one or more macropores, enabling passage of phase change material between macropores through the micropores of the lattice. An example lattice structure 202, 222 is depicted in FIGS. 2b, 2d, respectively.

With regard to the characteristics of a particular open-cell phenolic foam, the relative number of lattice structures to the number of macropores may affect the rate at which a phase change material is absorbed into the foam, and it may further affect the retention of the phase change material within the foam. For example, in a macropore where there are no lattices present, the phase change material may be able to travel to or from adjacent macropores without first having to travel through or between the micropores which define a lattice. Thus, in a foam characterized as having relatively fewer lattice formations per macropore, flow of a given phase change material is less impeded by the foam material, which may result in faster absorption rates, while at the same time, however, it may result in less retention. Alternatively, in another example, in a macropore where there are one or more lattices present, the phase change material may pass through the micropores of the lattice when traveling to or from another macropore. Thus, in a foam characterized as having relatively more lattice formations per macropore, flow of the phase change material would be relatively more impeded by the foam material, which may result in slower absorption rates, while at the same time, however, it may result in greater retention.

As previously discussed, different phase change materials may be characterized as having greater of lesser viscosities. The higher the viscosity of a phase change material, the slower it may be to achieve absorption into a given open-cell phenolic foam or other means for absorbing. However, phase change materials with a higher viscosity may display less of a tendency to desorb from the foam (that is, they may have better retention or drainage characteristics). Thus, making a phase change device in accordance with the present disclosure may involve optimizing the matching between foam materials having defined lattice characteristics, and phase change materials having defined viscosity. Optimization may be conducted with regard to the absorption time of the phase change material, the retention of the phase change material within the foam, and other process variables. Examples of optimizing foam material selection with phase change materials are provided below.

Phase Change Material and Compositions for Changing Phases.

Referring now particularly to the phase change material, suitable materials for use with the disclosed device may include both organic and inorganic materials, including salts, hydrated salts, fatty acids, paraffins, mixtures thereof, or other materials or means for changing phases as will be known to those skilled in the art. Because different phase change materials means for changing phases undergo phase change (or fusion) at various temperatures, the particular material that is chosen for use in the device may depend on the temperature at which the packaging is desired to be kept, which may include ranges between approximately −50 and +40 degrees Celsius.

In some embodiments used for a cold chain, an approximately 20-23 weight percent salt solution comprising sodium chloride and water may be provided as the phase change material. This particular phase change material is characterized by a phase change temperature of fusion of approximately −19 to −21 degrees Celsius. Such temperature range may be suitable for use with the packaging and shipment of many pharmaceutical products, such as drugs, vaccines, and other active biologics.

With reference again to FIGS. 2a-2b and 2c-2d, two foams having differing lattice characteristics are presented. As may be seen, FIG. 2b has fewer lattices structures per macropore than does FIG. 2d. In effect, the foam composition is more "open" in FIGS. 2c-2d than in FIGS. 2a-2b. Thus, in order to optimize the qualities of a foam to a selected phase change material, in accordance with the above discussion, the foam of FIGS. 2c-2d may be used in making a phase change device with a phase change material having a greater viscosity, while the foam of FIGS. 2a-2d may be used in making a phase change device with a phase change material having a lesser viscosity. In one representative example, the phase change material matched with FIGS. 2a-2d may be pure water, or water having a relatively low salt or other electrolyte composition, or other liquid phase change material that may have a similar viscosity when introduced to the foam. In another representative example, the phase change material matched with FIG. 2c-2d may be water having a relatively higher salt or other electrolyte solution, or other liquid phase change material that may have a similar viscosity when introduced to the foam. In a specific example, tap water (having a dynamic viscosity of 0.00282 to 0.0179 Poise, from 212 to 32 degrees Fahrenheit) may be added to the foam of FIGS. 2a-2b, and a 20-23 weight percent salt solution (having a dynamic viscosity of 0.00495 to 0.0255 Poise, from 212 to 32 degrees Fahrenheit) may be added to FIGS. 2c-2d in making phase change devices having phase change temperatures of approximately 0 degrees and −19 to −21 degrees Celsius, respectively.

Thus, it may be possible to make phase change devices using different phase change materials having different phase change temperatures, while still maintaining optimal absorbency speed and retention/drainage characteristics, using the optimization procedures described above with regard to the characteristics of the phase change material and the characteristics of the open-cell phenolic foam.

It has been found that a foam or means for absorbing described as having the above referenced characteristics from Smithers-Oasis of Kent, Ohio is particularly suitable for use with the approximately 20-23 weight percent aqueous salt solution phase change material used in a phase change device for −19 to −21 degrees Celsius. When used in combination, this foam material is capable of absorbing the salt solution phase change material at greater than approximately 98% by weight and greater than approximately 91% by volume. In one embodiment, the expected useful ranges for absorption are approximately 92%-99% by weight and approximately 88%-96% by volume. When using the absorption quantities for charging the foam with phase change material, there is little to no observed drainage, or "leakage," of phase change material after absorption is complete. In one embodiment, the foam drainage rate is in the range 3%-12%. This foam material or means for absorbing also is capable of maintaining its approximate rigidity and size after absorption of the phase change material, regardless of its temperature. These characteristics may be beneficial for applications in packaging and shipping, as it may be important to maximize the phase change material in the available volume and weight (to minimize shipping costs) and thereby to maximize the thermal mass available within a package to maintain the target temperature range. Furthermore, it may be important that the phase change device maintains its rigidity and size so as to remain in place during shipping (no slumping) and not to damage the packaged product.

Additionally, the above mentioned foam/phase change material combination has been found to have rapid absorbency characteristics for a salt solution phase change material. Rapid absorbency is desired for efficient manufacturing of a thermal unit. In particular, a certain volume of phase change material must be introduced throughout the volume of the foam material in a rapidly-moving assembly line process. In a limited time, the volume available must be filled, but the same volume should not rapidly exit from the material. As a packaging element, and a packaging element that may only have a one-time usage, the foam/phase change material combination must be made inexpensively.

Without being bound by theory, the rapid absorbency observed with the above-described foam material or means for absorbing may be due to the flow and capillary action caused by the particular combination and size of the macropores and the micropores, the relative amount of lattice structure, the electrostatic characteristics of the phenolic foam material, foam mass geometry and/or viscosity, reactivity or electrostatic characteristics of the salt solution. In particular, it has been found that the above-described foam material in a block having dimensions of approximately 6 inches wide by 6 inches long by 1.25 inches deep (suitable dimensions for many shipping applications) may reach essentially full absorption (i.e., with the above percentage ranges) of the above-described aqueous saline phase change material in approximately 5 to 35 seconds, without significant subsequent desorption (or "draining out") of the phase change material. These dimensions and times are intended as illustrative and not restrictive, as somewhat increased or decreased absorbency speed may be realized with other shapes and dimensions of foam material. The characteristic of rapid absorption to high levels are significant for the manufacturing process (which will be described in greater detail below) in terms of production speed and associated costs.

Other phase change materials or means for changing phases useable in the present device may include compositions produced in accordance with the process as described in U.S. Pat. No. 6,574,971, that have the desired phase change temperature and viscosity characteristics and the ability to be absorbed into the foam materials or other means for absorbing that are described above. The materials of U.S. Pat. No. 6,574,971 include fatty acids and fatty acid derivatives made by heating and catalytic reactions, cooling, separating and recirculating steps as more fully described in U.S. Pat. No. 6,574,971. The reactant materials include a fatty acid glyceride selected from the group consisting of oils or fats derived from soybean, palm, coconut, sunflower, rapeseed, cottonseed, linseed, caster, peanut, olive, safflower, evening primrose, borage, carboseed, animal tallows and fats, animal greases, and mixtures thereof. In accordance with the processes of U.S. Pat. No. 6,574,971 the reaction mixture is a mixture of fatty acid glycerides that have different melting points and the reaction is an interesterification reaction, or the reaction mixture includes hydrogen and the reaction is hydrogenation, or the reaction mixture is a mixture of fatty acid glycerides and simple alcohols and the reaction is an alcoholysis reaction.

Protective Covering.

Referring now particularly to the protective covering, a thin polymeric film may be provided to enclose or encapsulate the foam/phase change material in a manner as described above with reference to FIGS. 1a-d. Such films may require a high tensile strength in order to maintain integrity at a wide range of temperatures, approximately −50 to 40 degrees Celsius, while also having a low thickness to reduce weight, to be easily formable, and to aid the efficiency of the manufacturing process. Within the above specified temperature ranges, the covering may maintain a high enough elasticity to provide adequate containment of the foam and phase change materials during shipping applications. Further, high durability and puncture resistance may be additional, important characteristics of a protective covering such that the covering maintains its integrity in a shipping environment where the phase change device may be roughly handled or may encounter sharp or jagged edges of products or packaging. Prevention of leaking may help to assure that none of the phase change material comes into contact with the shipped product.

Figure 3A:
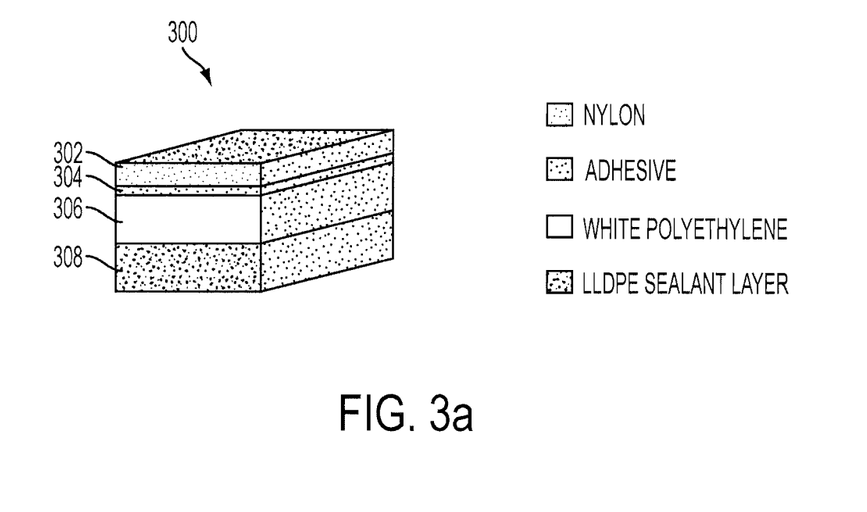
FIG. 3a is a cut-away view of the layers of a protective covering suitable for use in a phase change device.
Figure 3B:
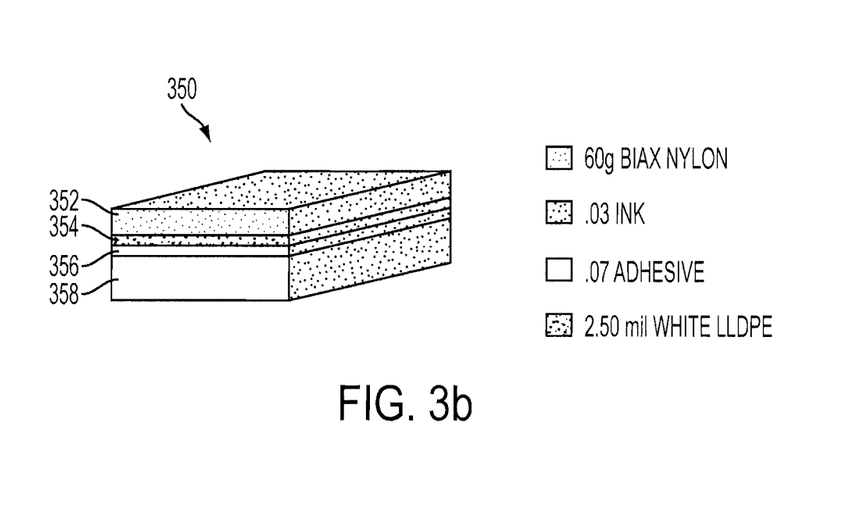
FIG. 3b is a cut-away view of the layers of another protective covering suitable for use in a phase change device.

In some embodiments, as depicted in FIG. 3a, a protective covering 300 may include a four layer film having a first layer of Nylon 302, a second layer of adhesive 304, a third layer of white polyethylene 306, and a fourth layer of LLDPE (linear low-density polyethylene) sealant 308, such film having an approximate thickness of 9.0 mils. In other embodiments, as depicted in FIG. 3b, a protective covering 350 may include a four layer film having a first layer of 60 g Biax Nylon 352, a second layer of 0.03 mils. thickness Ink 354, a third layer of 0.07 mils. thickness Adhesive 356, and a fourth layer of 2.5 mils. thickness White LLDPE 358. In some embodiments, the covering as depicted in FIG. 3b may provide the top layer or covering, while the covering depicted in FIG. 3a may provide the bottom/side layer of covering. Other materials or combinations of materials having these characteristics are widely commercially available.

It will be appreciated that phase change devices in accordance with the present disclosure may be designed so as to keep a packaged product at a temperature below the ambient or at a temperature above the ambient. In uses where the phase change device is intended to keep the packaged product below the ambient, the device will be provided with the phase change material in solid phase (cooled below its phase change temperature). In use, the device will absorb heat, and change phase to liquid, while maintaining the constant temperature as desired. In uses where the phase change device is intended to keep the packaged product above the ambient, the device will be provided with the phase change material in liquid phase (heated above its phase change temperature). In use, the device will give off heat, and change phase to solid, while maintaining the constant temperature as desired. It will also be appreciated that a combination of solid and liquid state phase change devices may be provided in applications where a wider range of temperatures is acceptable. The protective coating 300, 350 may be selected for remaining flexible and not brittle in the required temperature range and also, particularly as to the bottom film, as suitable for roll feeding and heat forming operations described next.

Method for Making Phase Change Device

A method for making a phase change device in accordance with the present disclosure may include a first step of selecting and providing a phase change material, a second step of selecting and providing a foam material, a third step of introducing the phase change material into the foam material, and a fourth step of sealing the foam material/phase change material within a protective covering. The above recited steps are not intended as limiting, nor are they intended to be restricted to the particular order recited. Other associated steps may be included, and they may be performed in different orders. Furthermore, the steps may be performed in multiple parts and at multiple different times.

Figure 4A:
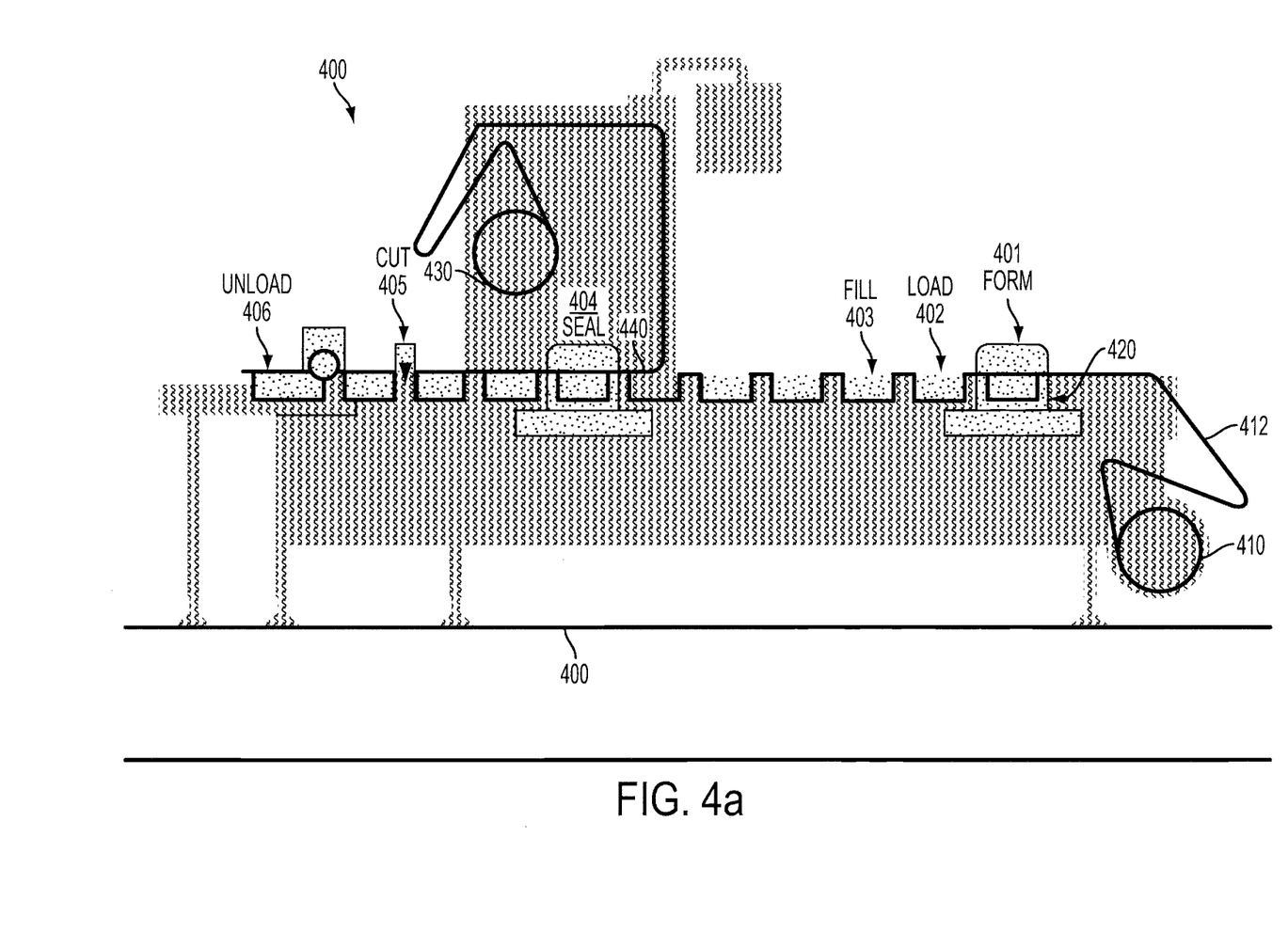
FIG. 4a is a diagram of an apparatus configured to operate in a process for making phase change device in accordance with the present disclosure.

With reference now to FIG. 4a, an apparatus 400 is depicted capable of performing the steps of the method for making a phase change device in accordance with the present disclosure. At stage 401, the bottom film of the protective covering may be formed. This occurs in a forming mold 420, into which a film 412 from a supply roll 410 is drawn and formed. At stage 402, a block of the foam material or means for absorbing may be loaded into the formed bottom film. At stage 403, the phase change material or means for changing phase may be introduced and absorbed into the foam material, as described in further detail below. At stage 404, the top film of the protective covering delivered from a supply roll 430 may be delivered to and sealed at a sealing station 440 onto the sealing edges of the bottom film (and over the filled foam/phase change material) in a manner as depicted in greater detail at FIG. 1d. At stage 405, extraneous film may be cut away from the formed device. At stage 406, the finished phase change device may be unloaded from the filling and sealing machine.

Figure 4B:
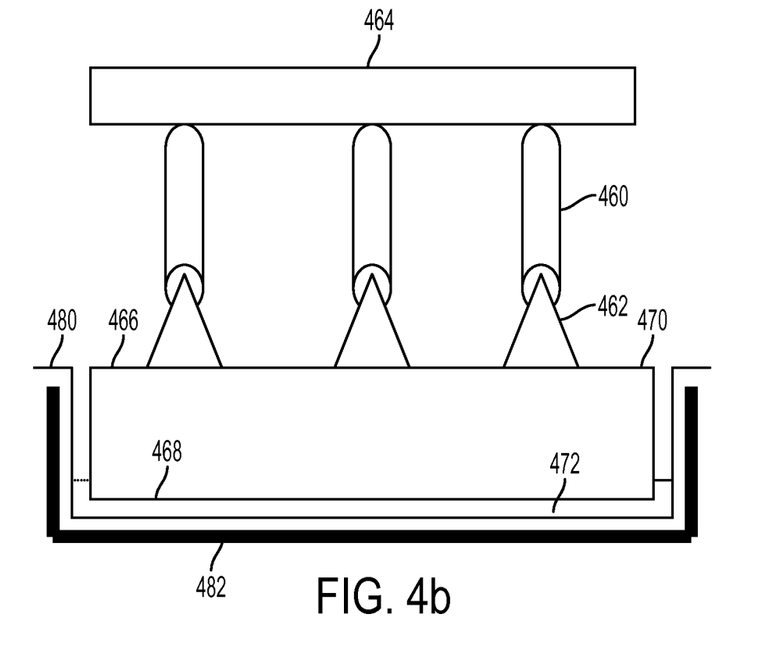
FIGS. 4b-4c are schematic side and top diagrams of an apparatus for introducing fluid phase change material to a foam material in accordance with the present disclosure.
Figure 4C:
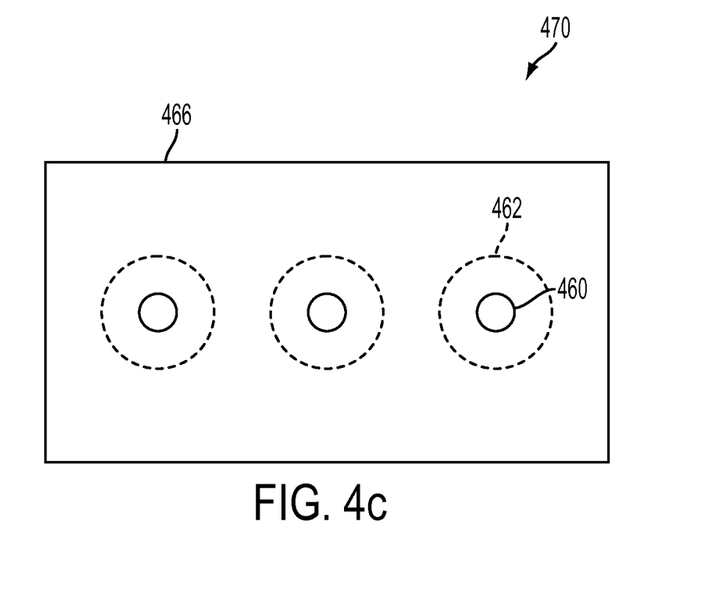

FIGS. 4b-4c show in schematic form the filling operation. The phase change material, e.g., a salt solution as described above, is provided from a filling reservoir and dispenser 464. This filling reservoir and dispenser 464 may have heater or other means for delivering the solution at a selected temperature. It has been noted that a temperature above a typical controlled room temperature may aid a filling operation by ensuring that any dissolved material remains in solution and by providing the fluid in a state more flowable or more conducive to entering the macropores and micropores of the foam block 470 that rests in the bottom film 480, which in turn rests in filling pocket 482. In one embodiment, a temperature of 60 to 80 degrees Fahrenheit has been found suitable for enhanced absorption of the above-described saline solution into the foam block 470. This temperature may vary for different phase change materials, but generally a controlled, elevated temperature will aid absorption speed. It has been observed that the absorption rate may increase greatly as temperature is initially increased above the phase change temperature. For example, with saline solution, absorption rates may increase several fold between approximately 30 degrees Fahrenheit and 80 degrees Fahrenheit. Temperatures up to 160 degrees Fahrenheit may also be used; however, beyond about 80 degrees Fahrenheit, absorption speed does not increase much with increases in temperature. Thus, due to economic considerations, i.e., the cost of heating of the phase change material, it has been found that preferable temperatures for filling foam device in accordance with the present disclosure may lie between 60 degrees and 80 degrees Fahrenheit. Without being bound by theory, the observed increase in absorption speed may be due to the lower viscosity of the phase change material at higher temperatures.

The filling reservoir and dispenser 464 may have multiple flow points or nozzles 460, from which a controlled volume of phase change material may be dispensed to top surface 466 of the foam material. Although three nozzles are shown, more or fewer may be used, to distribute flow to a larger portion of the top surface 466, where much of the phase change material may enter the foam block 470.

The speed of absorption is in part dependent on the surface area at which the phase change material is introduced. Accordingly, each of the multiple nozzles 460 emits a flow or spray 462 directed at a specific area of the top surface 466 of the foam block. Thus, the phase change material may enter at any macropores and micropores it reaches on the top surface 466. To the extent the dispensed phase change material volume exceeds the absorption at the top surface 466, the phase change material will flow down the four side surfaces of the foam block 470 and form a pool 472 within the bottom film. The bottom film is preferably formed into a pocket or well with a depth greater than the thickness (vertical height as seen in FIG. 4b) of the block 470 to accommodate any brief period where the phase change material forms the pool 472 before absorption. This pool 472 then delivers phase change material into the bottom surface 468 of the foam block 470 by capillary action. The filling reservoir and dispenser 464 includes a control unit that determines the amount of phase change material dispensed into each bottom film 480 and the rate of flow of that controlled amount. The amount is based on the known percentages of absorption and the foam block geometry, such that little excess phase change material enters the bottom film. With a selected amount of phase change material dispensed that corresponds to the known holding capacity of the foam block 470, the block 470 becomes filled to a high degree, rapidly, and there is little phase change material not absorbed into the block 470. Further, it is not necessary to provide special chambers to subject the foam block to vacuum and/or greater-than-atmospheric pressure in order to achieve the high level of absorption. Gravity and/or capillary action provide the desired action. Filling occurs by absorption at both the top surface 466 and the bottom surface 468 of the foam block 470.

It has been observed that the geometry of the foam block 470 workpiece plays a role in absorption speed. In general, the average thickness to top-face surface area ratio for the block 470 ranges from between approximately 1% to 8%. For example, a six inch square block has a surface area of 36 square inches. With a thickness of 1.25 inches, the thickness to top-face surface area is 3.47%. This geometry also implies that the maximum straight line path length (the actual path would not be a straight line, but rather follow macropores and micropores) for phase change material to reach a storage site is approximately the block thickness and will be less, to the extent the pool 472 feeds phase change material in from both the top and the bottom surfaces. Thus, selection of the geometry and dimensions of the foam block 470 workpiece may provide opportunities to decrease the time needed to reach the desired level of filling. The desired level of filling is high (on both a % weight and a % volume basis), to make efficient use of the volume defined by the foam block 470.

Figure 5A:
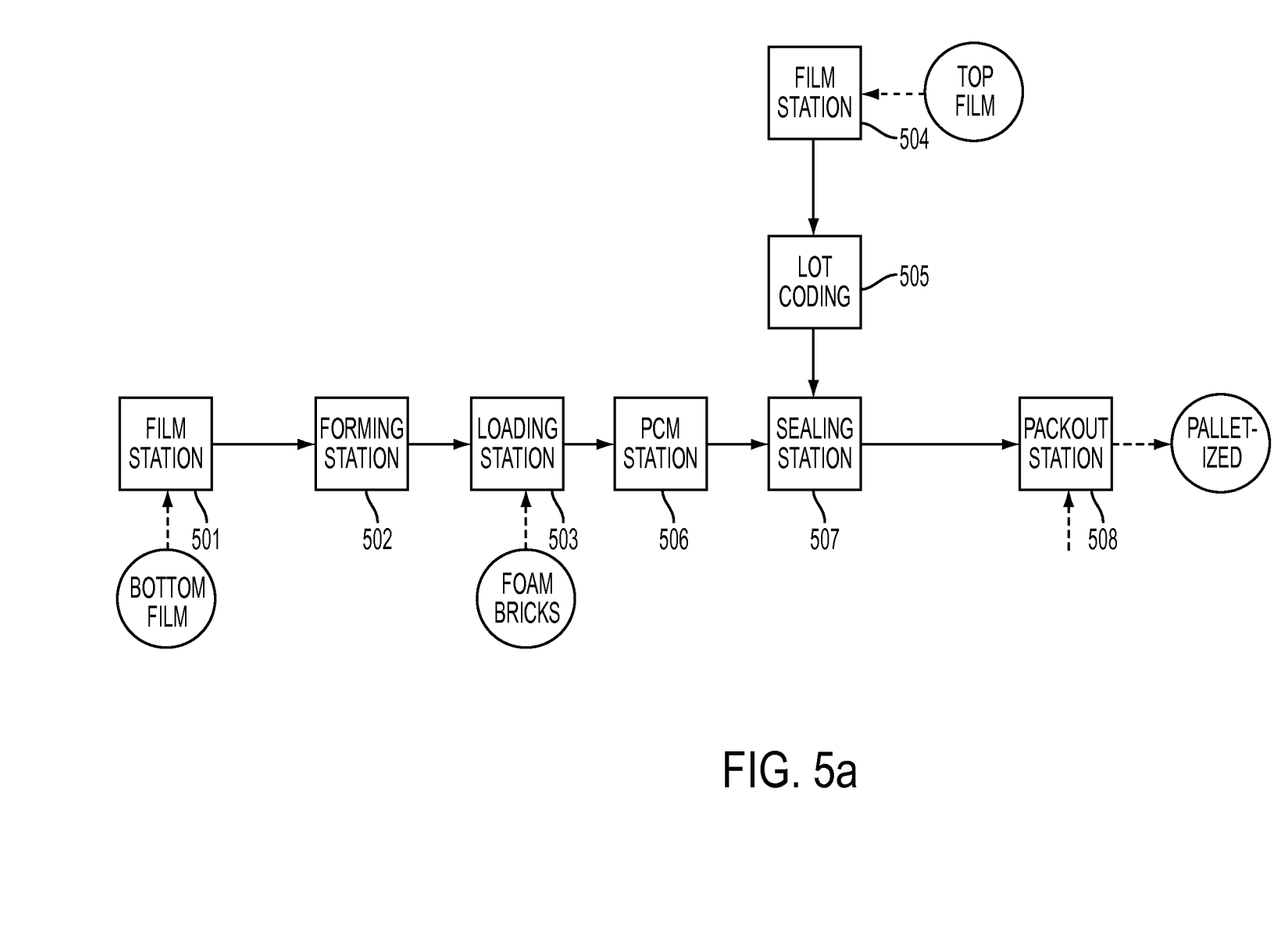
FIG. 5a is a schematic block diagram of a process for making phase change devices.
Figure 5B:
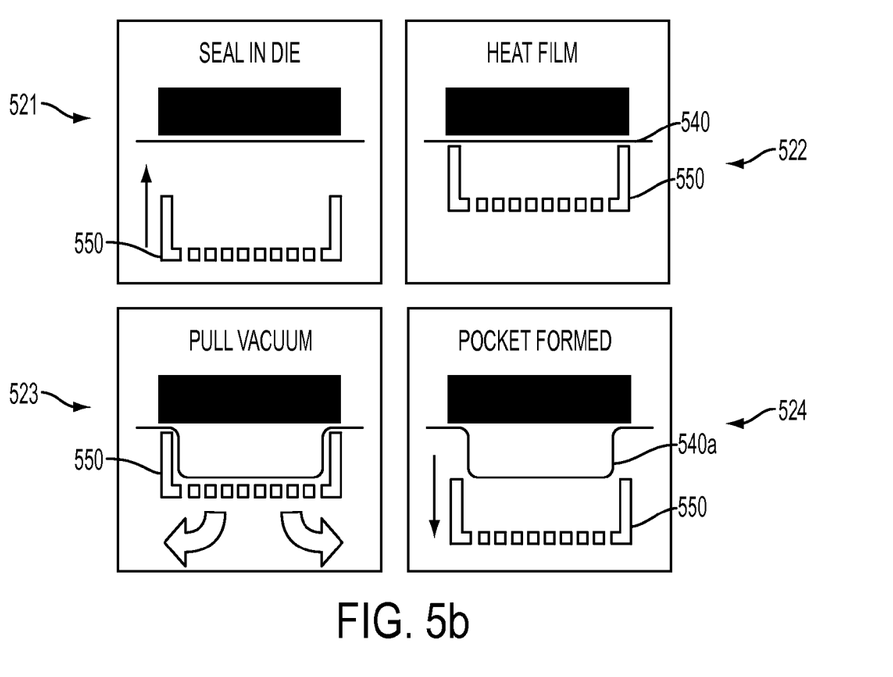

With reference now to FIG. 5a, a flow diagram is depicted illustrating a method for making a phase change device. At film station 501, the bottom film may be provided in roll or sheet form. At forming station 502, the bottom film is formed into the bottom film pocket as depicted in FIG. 1d. FIG. 5b depicts in greater detail the forming of the bottom film. The film 540 is provided at the top plane of a vacuum forming die 550, where it is heated and sealed against the upper lip of the die (see stages 521-522). A vacuum is applied to pull and stretch the heated film down into the forming station to form the bottom film 540a (see stages 523-524). With continued reference now to FIG. 5a, at loading station 503, foam material in the form of a three-dimensional rectangle or brick may be loaded into the formed bottom film pocket 540a. At phase change material (PCM) station 506, the phase change material may be dispensed and absorbed into the foam material.

Figure 5C:
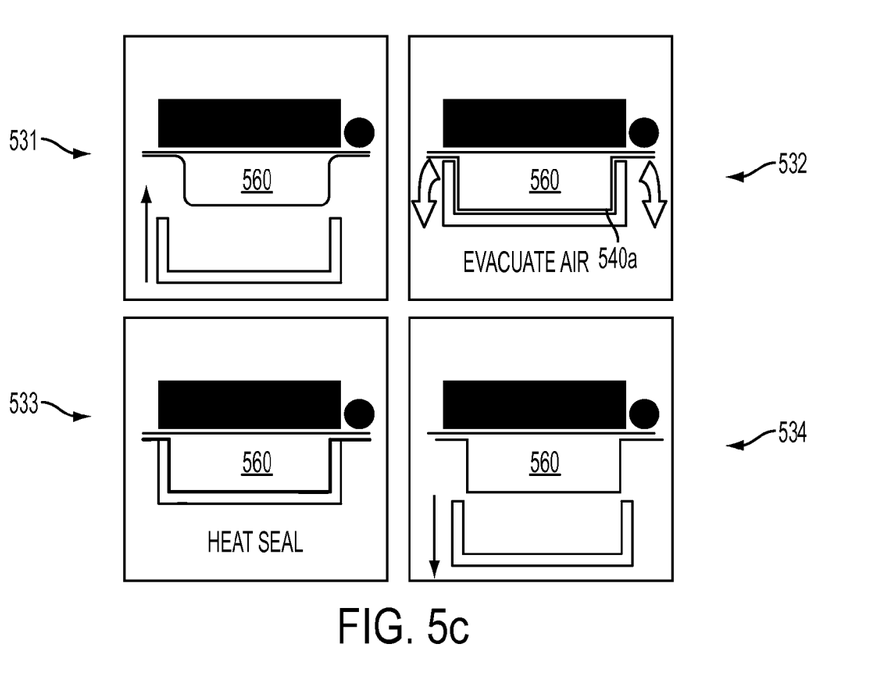

At film station 504, the top film may be provided in sheet form. At lot coding station 505, a code may be imprinted onto the top film to provide any designation as may be required by the manufacturer. At sealing station 507, the top film may be applied and sealed to the bottom film sealing edges (see FIGS. 1a-d), and the foam material/phase change material may be fully sealed within the protective cover. As seen in FIG. 5c, as part of sealing, any air within the volume defined by bottom film and top film and containing the foam material 560 filled with phase change material may be evacuated (see stages 531-532). A light vacuum, on the order of about 180 mbar is applied to avoid removal of phase change material from the foam as the air is withdrawn. The heating that accomplishes sealing of the top film and bottom film is then applied (see stages 533-534). Reducing or eliminating air within the volume defined by bottom film and top film increases the effectiveness of heat transfer across the film and into the phase change material, when the phase change device is deployed in an application. With continued reference now to FIG. 5a, at packout station 508, the finished phase change devices may be stacked on pallets for shipment to the customer or end user.

Reducing or eliminating air within the volume defined by bottom film and top film has other desirable effects. As noted above, the foam material may have some "drainage" defined by a test in which a foam block without any protective covering is placed in a position where it rests on an edge, i.e., on one of its narrowest surfaces, and the amount of phase change material that migrates out of the foam material in a defined period (e.g., five minutes, an hour) is measured as a percentage of the amount initially absorbed into the foam material. In one type of foam material discussed above, the supplier quotes a drainage specification of 3%-12%. It has been observed that reducing or eliminating air within the volume defined by bottom film and top film makes the protective coating cling to portions of the surface of the foam material and leaves little or no air to migrate into pores that might be vacated through drainage of phase change material. Also, to the extent drainage occurs, the clinging protective covering confines the phase change material is against the surface of the foam material. This appears to help reduce drainage once the foam material is encased within the protective coating. A useful result of reduced drainage is that the phase change material is less able to migrate. It stays in the pores into which it is absorbed. This means that the thermal mass largely stays where it is designed to stay in a package that includes one or more phase change devices, regardless of the orientation of the phase change devices. Thus, as the phase change material liquefies, it does not move significantly from where it was placed when the phase change material is solid. This helps avoid thermal transfer pathways that might undermine a package design based on the exact dimensions and position of foam material.

In embodiments using the salt water solution as the phase change material, the salt and water may be mixed thoroughly at a temperature of approximately 75-100 degrees Fahrenheit prior to dispensing into the foam material in order to ensure that all of the salt is fully dissolved. Further, the PCM station 506 may be designed to ensure that the phase change material solution is delivered for absorption at an above ambient temperature that aids rapid absorption and that the solution is fully, evenly, and homogeneously absorbed. These design considerations may provide for more accurate and effective thermal maintenance in the finished devices.

Although the present disclosure has been described with reference to various embodiments, persons skilled in the art will recognize that changes may be made in form and detail without departing from the spirit and scope of the invention.

What is claimed is:

1. A phase change device for controlling temperature within an environment, comprising:
    a means for changing phase that changes from a liquid to a solid and back to a liquid at a desired phase change temperature;
    a shape-stable means for absorbing the means for changing phase in its liquid form, so as to absorbed into the means for absorbing at greater than about 91 percent by volume of the means for absorbing, and at greater than about 98 percent by weight of the combined means for changing phase and means for absorbing; and
    a protective covering encasing the means for changing phase and means for absorbing.

2. The device of claim 1, wherein the means for absorbing is a foam selected from the group consisting of phenolic foam, phenol-aldehyde resol resin, phenol derivatives, polyurethanes, polystyrenes, and mixtures and combinations thereof.

3. The device of claim 2, wherein foam has micropores and macropores and at least a portion of the micropores are in a lattice within a macropore.

4. The device of claim 2, wherein the foam is characterized as having a density between about 0.00069 to 0.00084 pounds per cubic inch.

5. The device of claim 1 wherein the means for changing phase is selected from the group consisting of salts, hydrated salts, fatty acids, paraffins, and solutions, derivatives and mixtures thereof.

6. The device of claim 1, wherein the means for changing phase is a salt solution comprising sodium chloride, the salt composition being between about 20 to 23 weight percent of the solution.

7. The device of claim 1 wherein the shape-stable means for absorbing is characterized as having macropores of a diameter between about 100 to 400 microns, and micropores of a diameter between about 0.5 to 100 microns.

8. The device of claim 1, wherein temperature is controlled between about −19 to −21 degrees Celsius.

9. The device of claim 1, wherein the protective covering comprises a Nylon layer, an adhesive layer, a white polyethylene layer, and an LLDPE sealant layer.

10. The device of claim 1, wherein the protective covering comprises a 60 g Biax Nylon layer, an ink layer having a thickness of about 0.03 mils, an adhesive layer having a thickness of about 0.07 mils, and a white LLDPE layer having a thickness of about 2.5 mils.

11. The device of claim 2, wherein the foam is in the form of a workpiece wherein the average thickness to surface area ratio ranges from about 1% to about 8%.

* * * * *